3,443,789
PLUG VALVE
Clarence O. Glasgow and Charles A. Bucklin, Tulsa, Okla., assignors to Custom Engineering & Manufacturing Corporation, Tulsa, Okla.
Filed June 27, 1966, Ser. No. 560,664
Int. Cl. F16k 1/02, 27/08
U.S. Cl. 251—214                                          2 Claims

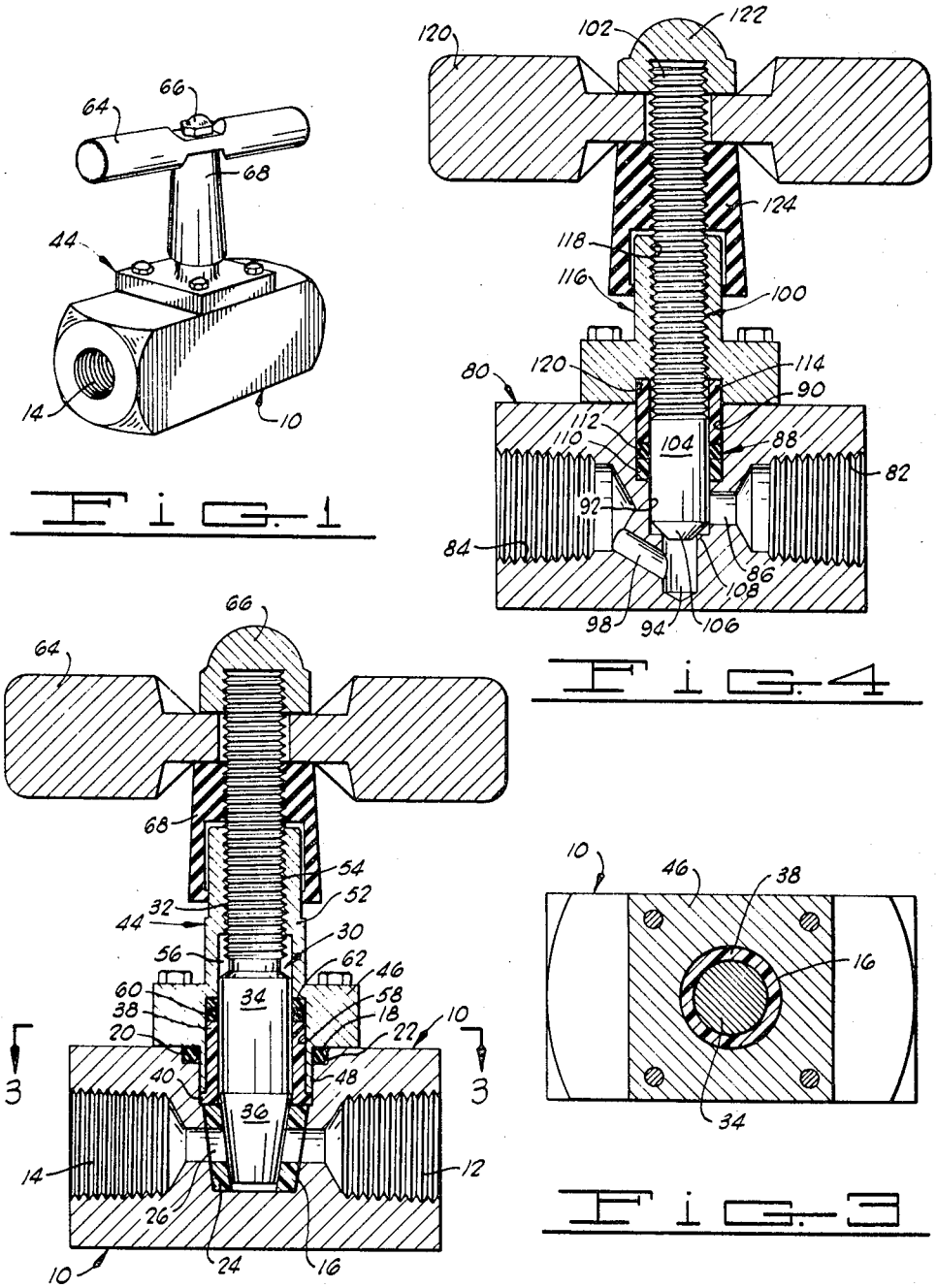

ABSTRACT OF THE DISCLOSURE

A valve including a valve body which has an inlet port, an outlet port, a stem opening and an internal stem cavity which communicates with the opening and ports. A removable valve seat is located in the stem cavity, and the valve further includes a valve stem structure having a valve seat portion at one end located in the stem cavity to sealingly engage the seat. Spaced from the seat portion is a threaded portion of the stem structure, and this is positioned at least partially outside the valve body and engages a bonnet secured to the body. The bonnet includes a portion which surrounds a cylindrical stem guide which in turn surrounds a smooth walled portion of the stem structure. When the bonnet is secured in position, the stem guide is pressed radially into sealing engagement with the valve stem structure, and is also forced axially against the valve seat to retain it in operative position.

---

This application relates to plug valves, and more specifically, to metering valves of the type used in high pressure service for accurately controlling the flow of a fluid through the valve.

In certain industries, such as the oil industry, it is frequently desirable to accurately control or meter the flow of a fluid through a line or pipe, and to maintain a desired rate of flow through the pipe over extended periods of time. For this purpose, plug type valves are frequently used. Where the service in which the valve is used requires the fluid flow to be maintained at a constant rate over an extended period of time, and where the fluid which is involved is particularly corrosive, or carries abrasive materials, there is a tendency for valves of this type to become frozen or stuck in the position at which they are set over an extended period of time so that it is difficult to change their degree of closure without damaging the valve. Frequently, careless operators will even twist the valve stems off in an effort to free metering valves of this type which have become frozen due to occupying a constant status over extended periods of time.

The present invention provides an improved metering valve which can be employed for accurately metering fluids flowing through a line, conduit or pipe, and such valve is constructed in a way which prevents freezing of the valve stem within the valve body, damage to the threaded portion of the valve stem which is employed and, in general, is characterized in having an extended service life and a minimum maintenance requirement. Broadly described, the valve of the invention comprises a valve body having an outlet port, an inlet port, a stem opening, and a stem cavity in the valve body, the stem cavity being in communication with the outlet and inlet ports, and with the stem opening. A valve seat is located in the stem cavity and, in a preferred embodiment of the invention, is a removable seat constructed of a high density synthetic resin, and preferably Delrin, an acetal resin sold under this trademark by the E. I. du Pont de Nemours & Company of Wilmington, Del. The valve further comprises valve stem means extending into the stem cavity of the valve body through the stem opening therein, and including a frusto-conically shaped seat portion positioned to sealingly engage the valve seat, and a threaded portion positioned at least partially outside of the valve body. A high density synthetic resin stem guide is provided inside the valve body in a position to line the stem cavity, and to slidingly surround and sealingly engage the portion of the stem means which is between the frusto-conically shaped seat portion of the stem means and the threaded portion thereof.

A bonnet is detachably secured to the valve body and surrounds and threadedly engages the threaded portion of the stem means. Finally, in one embodiment of the invention, a handle is secured to one end of the stem means outside the valve body and is utilized to rotate the stem means about its axis to cause it to reciprocate in the valve cavity in the valve body.

The high density synthetic resin stem guide which is utilized in the metering valve of the present invention is preferably constructed of Delrin. We have determined that this material possesses unique properties which are particularly adapted for use in a valve of the type here under consideration in that it provides excellent protection to the threads of the valve stem and prevents contact of these threads with corrosives or abrasive fluids flowing through the valve, and prevents corrosion of the valve over extended periods of time with resultant freezing of the valve stem. Delrin has excellent cold flow properties (considerably superior to Teflon), a low coefficient of friction, a high resistance to chemical attack and good abrasion resistance. By providing the unique chemical and physical characteristics of this synthetic resin in conjunction with a particular geometric configuration of the Delrin stem guide (as will be hereinafter described), we have found that metering valves constructed in accordance with our invention can be set and retained at a fixed position for periods as long as six months while highly abrasive and corrosive fluids are flowing through the valve without the valve becoming frozen or stuck to any degree.

In a preferred construction of the metering valve as thus broadly described, a frusto-conical seat which is also constructed of Delrin (as previously described) is provided and cooperates with the Delrin isolating stem guide sleeve. This valve seat can be easily removed from the valve body by the simple procedure of removing the bolted bonnet which is employed and extracting the entire stem assembly and seat from the valve. The particular construction of the bonnet and the manner in which it cooperates with the Delrin isolating stem guide permits the bonnet to be bolted tightly to the body in such a way that an excellent seal is continuously maintained between the bonnet and the valve body, and between the Delrin stem guide and seat and the moving parts of the valve stem.

From the foregoing description of the invention, it will have become apparent that it is a major object of the present invention to provide an improved metering plug valve which does not stick or become frozen when left in an open or closed position for an extended period of time.

An additional object of the present invention is to provide a metering valve which can be quickly and easily repaired by removing all internal and moving parts from the valve through the simple operation of removing the bolted bonnet from the valve body to permit access to the interior of the valve body.

An additional object of the present invention is to provide an improved metering valve which is characterized in having an extended and trouble-free operating life, and which functions efficiently when in use to maintain a fixed setting and deliver a constant predetermined amount of fluid through the valve without the movable valve stem becoming frozen in a fixed or set position.

In addition to the foregoing described objects and advantages of the invention, additional objects and advantages will become apparent as the following detailed description of the invention is considered in conjunction with the accompanying drawings.

In the drawings:

FIGURE 1 is a perspective view of one embodiment of the metering valve of the invention.

FIGURE 2 is a vertical sectional view taken through a metering valve such as the one shown in FIGURE 1 and illustrating a construction of the valve stem and valve seat utilized in this embodiment of the invention.

FIGURE 3 is a sectional view taken along line 3—3 of FIGURE 2.

FIGURE 4 is a vertical sectional view similar to FIGURE 2, but showing a different embodiment of the invention.

Referring now to the drawings in detail, and particularly to FIGURES 1 and 2, the valve comprises a valve body 10 having internally threaded inlet and outlet ports 12 and 14, respectively. The valve body 10 also includes a centrally disposed stem cavity 16 which communicates with a stem opening 18. The stem opening 18 includes an annular groove 20 which receives or accommodates an O-ring or other sealing element 22 for a purpose hereinafter described. It will be noted in referring to FIGURE 2 that the lower end of the stem cavity 16 is generally frusto-conical in configuration. A frusto-conical seat 24 which is dimensioned to mate with the frusto-conical portion of the stem cavity 16 is positioned in this portion of the cavity and is characterized in having a fluid flow passageway 26 formed therethrough and communicating with the inlet port 12 and the outlet port 14.

Extending into the stem cavity 16 in the valve body 10 is a valve stem means designed generally by reference character 30. The valve stem means 30 includes an elongated threaded portion 32 which, in the embodiment of the valve illustrated in FIGURE 2, is positioned predominantly outside the valve body 10, and a smoothed walled shank portion 34. The valve stem means also includes a frusto-conical seat portion 36 which is secured to the lower end of the smoothed walled shank portion 34 and is dimensioned to mate with the frusto-conical valve seat 24.

It will be noted that the smooth walled shank portion 34 of the valve stem means 30 is of cylindrical configuration and is of larger diameter than the threaded portion 32. This construction permits sealing and guiding contact to be maintained with the smooth walled portion 34 by an elongated cylindrical high density synthetic resin stem guide 38 and also provides a positive stop limiting reciprocating movement of the stem means as hereinafter described. The stem guide 38 is of cylindrical configuration and is positioned partially within the stem cavity 16 and projects out of the valve body 10 through the stem opening 18. This permits it to be easily and quickly gripped and removed when the valve bonnet is removed as hereinafter described. The inside diameter of the high density synthetic resin stem guide 38 corresponds to the outside diameter of the smooth walled shank portion 34 of the stem means 30 and slidingly engages the shank portion during operation of the valve.

It will be noted that the internal end of the stem guide 38 carries a radially extending, annular flange 40 which projects to, and abuts against, the surrounding wall of the stem cavity 16. The outside diameter of the remaining portion of the guide 38 is of smaller diameter than the stem cavity 16 so that a space exists between the stem guide and the wall of the stem cavity. The stem guide 38 is preferably constructed of an acetal plastic such as Delrin for reasons hereinbefore described.

A bonnet designated generally by reference character 44 includes an apertured base portion 46 which is secured to the valve body 10 by bolts extended through the apertures in the base portion 46 and into aligned apertures in the valve body 10. The bonnet 44 also carries an axially extending annular flange 48 which extends into the space defined between the stem guide 38 and the surrounding wall of the stem cavity 16. The axially extending flange 48 is diametrically dimensioned to force the stem guide 38 into sealing contact with the smooth walled portion 34 of the stem means 30 and thus assure the retention of a good fluid-tight seal between these elements. The axially extending flange 48 also is of a length such that it bears against the flange 40 at the inner end of the stem guide 38 and forces the stem guide downwardly against the synthetic resin valve seat 24 when the bonnet 44 is bolted in position.

The bonnet 44 also has integrally formed with the apertured base portion 46 thereof, an outwardly extending or protuberant neck portion 52. The neck portion 52 has a threaded bore 54 formed in the outer end thereof for threadedly receiving the threaded portion 32 of the stem means 30. The neck portion 52 of the bonnet 44 also has a counterbore 56 therein which communicates with the bore 54, and with a counterbore 58 formed in the base portion 46 to receive the stem guide 38. Between the upper end of the guide sleeve 38 and the shoulder which is formed at the intersection of the counterbore 58 with the counterbore 56, an O-ring 60 made of a resilient material, such as rubber, is positioned between the top end of the stem guide 38 and a Teflon back-up ring 62 which bears against the shoulder.

At its upper end which projects outside of the bonnet 44, the threaded portion 32 of the stem means 30 is keyed to a suitable valve operator, such as a handle 64. An acorn nut stem protector 66 is threaded on the end of the threaded portion 32 of the stem means 30. A synthetic rubber thread protector 68 is positioned between the handle 64 and the upper end of the cage 44 and functions to protect the threads from contact with deleterious materials.

OPERATION

In the operation of the metering valve, the handle 64 is rotated to in turn rotate the stem means 30 to effect the opening and closing of the valve. The valve becomes closed when the frusto-conical portion 36 of the stem means 30 is fully seated and in contact with the frusto-conical high density synthetic resin seat 24. Rotation of the handle 64 will effect the opening of the valve from this position by moving the stem means 30 upwardly in the valve cavity 16 and withdrawing the frusto-conical portion 36 of the stem means from the valve seat 24. Fluid flow through the valve is established from the inlet port 12 through the flow passageway 26 of the valve seat 24 to the outlet port 14.

The employment of the Delrin stem guide 38 for contacting, sealing and guiding the smooth walled shank portion 34 of the stem means 30 over a substantial portion of its length assures that none of the corrosive or abrasive fluid flowing through the metering valve can seep and infiltrate past the packing around the valve stem means 30 to a position where it will contact the threaded portion 32 of the stem means. In this way, the threaded portion 32 is continuously maintained in a dry state, and even though the valve is permitted to stand in its opened position, or in some intermediate position, for extended periods of time, it will not become frozen or stuck in this position as a result of corrosion and fouling of the threads of the stem means. The Delrin stem guide 38 also has a marked advantage over other types of synthetic resin materials which have previously been used as packings in various types of valves. This advantage results from the excellent cold flow properties of the Delrin which permit it to be placed under compression by tightening of the bonnet 44 without resulting extrusion or permanent deformation. This permits the establishment of continuous sealing contact with the smooth walled portion 34 of the stem means 30.

At any time that it may be desired to repair the valve by replacement of any of the parts thereof, the bonnet 44 can be removed from the valve body 10 by loosening the bolts which secure it thereto. After removal of the bonnet 44, the Delrin stem guide 38, the O-ring 60 and the high density synthetic resin back-up ring 62 can be removed from the stem cavity 16. Next the frusto-conical seat 24 can be removed and replaced if necessary. This is a valuable feature since in some types of service, the seat 24 is subjected to constant abrasion and wear, and the ability to replace the seat relatively frequently and with a minimum of difficulty is a desirable characteristic of the valve.

An alternate embodiment of the invention is illustrated in FIGURE 4 of the drawings. In this embodiment, several structural elements employed are substantially identical to structural elements used in the embodiment of the invention illustrated in FIGURE 2. Where such identical elements appear, they are identified by identical reference numerals.

In the embodiment of the valve shown in FIGURE 4, the valve body 80 is provided with an internally threaded inlet port 82 and an internally threaded outlet port 84. A small passageway 86 is coaxially aligned with the inlet port 82 and is in communication therewith, and also communicates with a stem cavity 88 located centrally in the valve body 80. The stem cavity 88 includes a relatively large diameter portion 90, a central, intermediate diameter portion 92 and a relatively small diameter discharge portion 94, all three portions of the stem cavity being axially aligned with each other and extending in a direction which is generally normal to the direction of extension of the axis of the passageway 86 and inlet port 82. An angular discharge passageway 98 extends upwardly from the small diameter discharge portion 94 of the stem cavity 88 and communicates with the internally threaded discharge port 84.

As in the case of the embodiment of the invention illustrated in FIGURE 2, the valve stem means 100 of the embodiment of the invention illustrated in FIGURE 4 includes a threaded portion 102, a smooth walled cylindrical shank portion 104 and a frusto-conical portion 106. The frusto-conical portion 106 bears against, and mates with, an annular seating edge which is formed by the shoulder 108 which is located at the intersection between the intermediate diameter portion 92 and the small diameter portion 94 of the stem cavity 88.

Positioned in the lower end of the relatively large diameter portion 90 of the stem cavity 88 is a high density synthetic resin wiper ring 110 which is preferably constructed of Delrin for the reasons hereinbefore described. The wiper ring 110 closely surrounds and sealingly engages the smooth walled shank portion 104 of the stem means 100. Adjacent the wiper ring 110 is a resilient sealing ring 112 which is preferably constructed of synthetic rubber and is preferably of the quad ring type. Finally, a high density synthetic resin back-up sleeve and stem guide 114 is provided on the opposite side of the quad ring seal 112 from the wiper ring 110 and sealingly surrounds the smooth walled portion 104 of the stem means 100 and projects out of the large diameter portion 90 of the stem cavity 88 in the valve body 80.

A valve bonnet 116 is bolted to the valve body 80 and is characterized in having a bore 118 through which the threaded portion 102 of the stem means 100 extends. The bonnet 116 also includes a counterbore 120 which receives the upper end of the back-up sleeve stem guide 114. When the bonnet 116 is bolted to the valve body 80, the back-up sleeve stem guide 114 is forced downwardly in the stem cavity 90 and places the resilient sealing ring 112 in compression to form a tight seal with the smooth walled shank portion 104 of the stem means 100.

At its upper end, the threaded portion 102 of the stem means 100 is keyed to a handle 120 and an acorn type thread protector nut 122 is threadedly secured to the upper end of the stem means 100. A thread protector 124 is threaded on and surrounds the threaded portion 102 of stem means 100 between the handle 120 and the upper end of the bonnet 116.

In the embodiment of the invention illustrated in FIGURE 4, both the wiper ring 110 and the back-up sleeve stem guide 114 are preferably formed of a high density acetal resin, such as the Delrin material hereinbefore described. It will be noted that in this embodiment of the invention, the inside diameter of the back-up sleeve stem guide 114 is such that clearance is provided between this member and the threads of the threaded portion 102 of the stem means 100. A sliding fit is provided, however, between the stem guide 114 and the smooth walled shank portion 104 of the stem means.

The operation of the valve depicted in FIGURE 4 is substantially the same as that of the embodiment which is illustrated in FIGURE 2, and the FIGURE 4 embodiment is characterized in having substantially the same trouble-free performance as is characteristic of the FIGURE 2 embodiment. Of the two types of valves, however, the FIGURE 2 embodiment is preferred due to the replaceability of the frusto-conically shaped valve seat, and the longer and more effective service life of this valve. Both valves are capable of operating at 6000 p.s.i. (water pressure) at a temperature of 200° F.

Although it is recognized that other types of plug or meter valves have been previously provided with packings of various types around a portion of the reciprocating stem, the overall and complete protection afforded to the threads of the valve stem, the ability of the valve to function at fixed settings over extended periods of time without freezing, and the extreme simplicity and ease of maintenance which characterize the valve of this invention are all believed to be characteristics which have not been presented in any of the types of metering valves presently on the market. The metering valve of this invention has functioned effectively for periods in excess of six months up to the present time under conditions where a number of other metering valves now commercially available have failed within periods ranging from 30 to 60 days. It is therefore believed that the valve of the present invention presents a worthwhile and patentable improvement over metering type valves as heretofore known.

Although certain specific embodiments of the valve have been illustrated and described in this application in order to provide examples of the practice of the invention which will enable those skilled in the art to utilize its basic principles, certain changes and modifications can be effected in these embodiments without departure from the basic principles which permit the valve to attain superior operation.

We claim:

1. A metering valve comprising:
   a valve body having an inlet port, an outlet port, and a stem opening, and further having a stem cavity in said valve body communiacting with said inlet and outlet ports and said stem opening;
   a valve seat in said stem cavity;
   valve stem means extending into said valve body through said stem opening, and having a frusto-conically shaped seat portion positioned to sealingly engage said valve seat and a threaded portion positioned at least partially outside said valve body;
   a high density synthetic resin stem guide in said stem cavity and slidingly surrounding and sealing a portion of said stem means between the frusto-conically shaped seat portion and the threaded portion of said stem means, said stem guide further having an external, radially extending flange formed on the lower end thereof;
   a bonnet detachably secured to said body and surrounding and threadedly engaging the threaded portion of said stem means, said bonnet further including a flange portion extending into said stem cavity surrounding said stem guide and cooperating with said external flange of said stem guide to force said stem guide into abutting contact with said seat and into sealing engagement with said stem means; and a handle secured to the end of said stem means outside of said stem body.

2. A metering valve comprising:

a valve body having an inlet port, an outlet port, a stem opening, and further having a stem cavity in said valve body communiacting with said inlet and outlet ports and said stem opening a valve seat in said stem cavity;

valve stem means extending into said valve body through said stem opening and having a frusto-conically shaped seat portion positioned to sealingly engage said valve seat upon closure of said valve, and a threaded portion positioned at least partially outside said valve body, said stem means further including a smooth walled cylindrical portion between said seat portion and said threaded portion with said smooth walled cylindrical portion being of smaller diameter than said stem opening;

a bonnet detachably secured to said body and having a neck portion surrounding and threadedly engaging the threaded portion of said stem means, said bonnet having a counterbore therein communicating with the stem opening in the valve body;

a high density resin stem guide of elongated hollow cylindrical configuration positioned around said stem means in said stem opening and in said counterbore and compressed between said bonnet and body, said stem guide threadedly engaging at its interior surface, the smooth walled cylindrical portion of said stem means and sealingly positioned between said body and stem means, said stem guide, by reason of said compression and said extension into said counterbore, being exposed and easily removable from said valve body when said bonnet is detached from the valve body; and a handle secured to an end of said stem means outside of said valve body and bonnet.

References Cited

UNITED STATES PATENTS

| | | | |
|---|---|---|---|
| 2,564,168 | 8/1951 | Meador et al. | 251—363 |
| 2,646,959 | 7/1953 | Carver | 251—223 |
| 2,776,104 | 1/1957 | Sinkler | 251—368 X |
| 2,797,062 | 6/1957 | Otter | 251—328 X |
| 2,973,774 | 3/1961 | Clure | 137—382 |
| 2,988,321 | 6/1961 | Gilmont | 251—214 |
| 3,185,179 | 5/1965 | Harautuneian | 251—368 X |
| 3,185,437 | 5/1965 | Rice | 251—214 X |
| 3,240,230 | 3/1966 | Callahan et al. | 251—223 X |
| 3,305,210 | 2/1967 | Danner | 251—214 |

FOREIGN PATENTS

| | | |
|---|---|---|
| 523,298 | 3/1956 | Canada. |
| 920,280 | 3/1963 | Great Britain. |

WILLIAM F. O'DEA, *Primary Examiner.*

D. R. MATTHEWS, *Assistant Examiner.*

U.S. Cl. X.R.

137—315, 382, 454.6; 251—223, 360, 367, 368